United States Patent

Yoshida et al.

Patent Number: 6,069,673
Date of Patent: May 30, 2000

[54] CRT FOCUS CORRECTING METHOD, CRT FOCUS CORRECTING CIRCUIT AND DISPLAY UNIT

[75] Inventors: Koichi Yoshida; Koji Tanaka, both of Tokyo, Japan

[73] Assignee: Mitsubishi Denki Kabushiki Kaisha, Tokyo, Japan

[21] Appl. No.: 08/974,224

[22] Filed: Nov. 19, 1997

[30] Foreign Application Priority Data

Jul. 28, 1997 [JP] Japan .................................. 9-201975

[51] Int. Cl.⁷ .............................. H04N 3/22; H04N 3/26
[52] U.S. Cl. .................. 348/806; 348/745; 315/382.1; 315/382
[58] Field of Search ...................... 348/806, 807, 348/745–747; 315/382, 382.1, 368.11, 368.21, 368.22, 368.23, 368.24; H04N 3/22, 3/26

[56] References Cited

U.S. PATENT DOCUMENTS

| | | | |
|---|---|---|---|
| 4,039,899 | 8/1977 | Battjes et al. | 315/371 |
| 5,301,025 | 4/1994 | Hatano et al. | 348/704 |
| 5,455,492 | 10/1995 | Turnbull | 315/382 |

FOREIGN PATENT DOCUMENTS

| | | |
|---|---|---|
| 4-357772 | 12/1992 | Japan . |
| 5-75885 | 3/1993 | Japan . |
| 5-207316 | 8/1993 | Japan . |

*Primary Examiner*—Michael H. Lee
*Attorney, Agent, or Firm*—Burns, Doane, Swecker & Mathis, LLP

[57] ABSTRACT

A CRT focus correcting method and correcting circuit are arranged as follows. Size data of a picture size set externally are compared with size data of a reference picture size, and when it is detected that a picture size has been changed, calculation correction data are obtained based on reference correction data and both the size data. When a parabola waveform voltage based on the calculation correction data is applied to a focus coil, a CRT focus is corrected according to a change in the picture size.

9 Claims, 6 Drawing Sheets

CRT FOCUS CORRECTING METHOD, CRT FOCUS CORRECTING CIRCUIT AND DISPLAY UNIT

BACKGROUND OF THE INVENTION

The present invention relates to a CRT (cathode-ray tube) focus correcting method and CRT focus correcting circuit which are used for a display unit such as a display monitor and a television, and relates to a display unit provided with the CRT focus correcting circuit.

FIG. 1 is a block diagram showing an example of a configuration of a conventional CRT focus correcting circuit for correcting a CRT focus disclosed in Japanese Patent Application Laid-Open No. 4-357772(1992). This CRT focus correcting circuit is provided with a $E^2P$-ROM 1. The $E^2P$-ROM 1 stores horizontal correction data, which are synchronized with a horizontal synchronizing signal, and vertical correction data which are synchronized with a vertical synchronizing signal, and size data of a picture size according to these correction data. The horizontal correction data and vertical correction data are used for generating a parabola waveform voltage for correcting a CRT focus according to a picture size on a CRT screen.

In addition, the CRT focus correcting circuit is provided with a horizontal correction wave generating circuit 2 supplied with horizontal correction data from the $E^2P$-ROM 1 thereinto, a vertical correction wave generating circuit 3 supplied with vertical correction data from the $E^2P$-ROM 1 thereinto, and horizontal and vertical correction wave synthesis circuit 4 for synthesizing and amplifying respective outputs from the horizontal correction wave generating circuit 2 and vertical correction wave generating circuit 3 so as to output them to a CRT focus coil or a focus correcting electrode. The horizontal correction wave generating circuit 2 generates a parabola waveform voltage based on the supplied horizontal correction data, and the vertical correction wave generating circuit 3 generates a parabola waveform voltage based on the supplied vertical correction data.

The following describes an operation of the CRT focus correcting circuit having the above configuration.

The horizontal correction data and vertical correction data, which are used for generating parabola waveform voltages correcting a CRT focus according to a picture size on the CRT screen, as well as size data of a picture size according to those correction data are previously stored in the $E^2P$-ROM 1.

When information relating to a picture size is inputted from a picture size set circuit (not shown) composed of a variable resistor provided on the front surface of the display unit into the $E^2P$-ROM 1, the $E^2P$-ROM 1 reads out horizontal correction data and vertical correction data according to size data of the picture size with them being synchronized with a horizontal synchronizing signal and vertical synchronizing signal.

The read-out horizontal correction data and vertical correction data are given respectively to the horizontal correction wave generating circuit 2 and the vertical correction wave generating circuit 3, and the horizontal correction wave generating circuit 2 and vertical correction wave generating circuit 3 output voltage signals based on the respective correction data.

The voltage signals outputted respectively from the horizontal correction wave generating circuit 2 and vertical correction generating circuit 3 are given to the horizontal and vertical correction wave synthesis circuit 4 and are synthesized and amplified therein so as to be outputted to the CRT focus coil or the focus correcting electrode. As a result, the parabola waveform voltage according to a picture size on the CRT screen for correcting the CRT focus is applied to the CRT focus coil or the focus correcting electrode.

As mentioned above, in the conventional CRT focus correcting circuit, correction data are previously stored in a memory, the correction data are read out according to an external instruction in a picture size, and a parabola waveform voltage is generated based on the read-out correction data. For this reason, in the case that correction data which are not previously stored in the memory are required, a parabola waveform voltage which continuously changes (not discretely) cannot be obtained according to a changed picture size. Moreover, in order to store data of the parabola waveform voltage which continuously changes so that the data can comply with a change in a frequency of the horizontal synchronizing signal, it is necessary to store another correction data which fill up a gap between the conventional correction data and which are used for obtaining a parabola waveform voltage which discretely changes, thereby requiring a large memory capacity.

BRIEF SUMMARY OF THE INVENTION

The present invention is invented in order to solve the above problems, and it is an object of the present invention to provide a CRT focus correcting method of generating a parabola waveform voltage which is used for correcting a CRT focus according to a change of a picture size and a change of a frequency of a horizontal synchronizing signal without demands of increasing memory capacity, and a CRT focus correcting circuit, and a display unit provided with the CRT focus correcting circuit.

A CRT focus correcting method of the present invention is characterized by comprizing the step of judging whether reference data relating to a picture size on a CRT screen or a frequency of a CRT horizontal synchronizing signal have changed or not; when the reference data have changed, calculating calculation correction data for correcting a CRT focus according to a changed data; and generating parabola waveform voltage based on the calculation correction data.

A CRT focus correcting circuit of the present invention is characterized by comprising detecting means for detecting a changed data of a reference data relating to a picture size on a CRT screen or a frequency of a CRT horizontal synchronizing signal; comparison means for comparing the reference data with the changed data; calculating means for when the compared result of the comparison means is such that the both data do not coincide with each other, calculating calculation correction data which are used for a CRT focus according to the changed data; and a parabola waveform voltage generating circuit for generating and outputting parabola waveform voltage based on the calculated result of the calculating means.

A CRT focus correcting method of the present invention is characterized by comprising the step of previously storing reference correction data, which are used for generating a parabola waveform voltage correcting a CRT focus according to a reference picture size on a CRT screen, and a first size data of the reference picture size, and comparing a second size data of a picture size set externally with the first size data, the step of when the first and the second the size data do not coincide with each other, calculating calculation correction data for correcting a CRT focus according to the set picture size based on the reference correction data and the first and the second size data, and the step of generating parabola waveform voltage based on the calculation correction data.

A CRT focus correcting circuit of the present invention is characterized by comprising a memory for storing reference correction data, which are used for generating a parabola waveform voltage correcting a CRT focus according to a reference picture size on a CRT screen, and a first size data of the reference picture size thereinto; a picture size set circuit for setting a picture size of the CRT screen and outputting a second size data of the set picture size; comparing means for comparing the second size data outputted by the picture size set circuit with the first size data of the reference picture size; calculating means for when the compared result of the comparing means is such that the first and the second size data do not coincide with each other, calculating calculation correction data which are used for correcting a CRT focus according to the picture size set by the picture size set circuit based on the reference correction data and the first and the second size data; and a parabola waveform voltage generating circuit for generating parabola waveform voltage based on the calculated result of the calculating means and outputting the parabola waveform voltage.

In the present invention, the reference correction data, which are used for generating the parabola waveform voltage correcting the CRT focus according to the reference picture size on the CRT screen, and the size data of the reference picture size are stored into the memory. The comparing means compares the size data outputted by the picture size set circuit with the size data of the reference picture size, and when the compared result is such that both the size data do not coincide with each other, the calculating means calculates the calculation correction data which are used for correcting a CRT focus according to the picture size set by the picture size set circuit based on the reference correction data and both the size data. The parabola waveform voltage generating circuit generates the parabola waveform voltage based on the calculated result and outputs the parabola waveform voltage. Therefore, the parabola waveform voltage, which is used for correcting a CRT focus, can be generated according to a change in the picture size without demands of increasing the memory capacity.

Further, a CRT focus correcting method is characterized by comprising the step of counting a frequency of a CRT horizontal synchronizing signal and comparing a second frequency which was counted this time with a first frequency which has been counted previous time, the step of previously storing upper and lower limit values of the frequency of the horizontal synchronizing signal, and respective reference correction data, which are used for generating parabola waveform voltages correcting respectively a CRT focus according to the upper and lower limit values, and when the first and the second frequencies do not coincide with each other as a result of the comparison, calculating calculation correction data which are used for correcting the CRT focus according to the second frequency counted this time based on the second frequency, the upper and lower limit values and the respective reference correction data, and the step of generating parabola waveform voltage based on calculation correction data.

A CRT focus correcting circuit of the present invention is characterized by comprising a memory for storing upper and lower limit values of a frequency of a CRT horizontal synchronizing signal and respective reference correction data which are used for generating parabola waveform voltages correcting respectively a CRT focus according to the upper and lower limit values thereinto; a frequency counting circuit for counting the frequency of the horizontal synchronizing signal; comparing means for comparing a second frequency which was counted this time by the frequency counting circuit with a first frequency which has been counted previous time by the frequency counting circuit; calculating means for when the compared result of the comparing means is such that the first and the second frequencies do not coincide with each other, calculating calculation correction data which are used for correcting a CRT focus according to the second frequency counted this time based on the second frequency, the upper and lower limit values and the respective reference correction data; and a parabola waveform voltage generating circuit for generating parabola waveform voltage based on the calculated result of the calculating means and outputting the parabola waveform voltage.

In the present invention, the upper and lower limit values of the frequency of the CRT horizontal synchronizing signal, and the reference correction data, which are used for generating the parabola waveform voltages correcting a CRT focus according to the upper and lower limit values, are stored into the memory. The comparing means compares the frequency counted this time by the frequency counting circuit with the frequency counted previous time by the frequency counting circuit, and when the compared result is such that both the frequencies do not coincide with each other, the calculating means calculates the calculation correction data which are used for correcting the CRT focus according to the frequency counted this time based on the frequency counted this time, the upper and lower limit values of the frequency and the reference correction data. The parabola waveform voltage generating circuit generates the parabola waveform voltage based on the calculated result and outputs the parabola waveform voltage. Therefore, the parabola waveform voltage, which is used for correcting the CRT focus, can be generated according to a change in the frequency of the horizontal synchronizing signal without demands of increasing the memory capacity.

In addition, a display unit of the present invention is characterized by comprising a CRT; a focus coil for correcting a CRT focus; and a CRT focus correcting circuit for applying a parabola waveform voltage to the focus coil. The display unit is characterized in that said CRT focus correcting circuit includes the aforementioned components.

Since at least one of the CRT focus correcting circuits mentioned above is provided, a CRT focus can be corrected according to a change of the picture size and/or of the frequency of the horizontal synchronizing signal without demands of increasing the memory capacity.

The above and further objects and features of the invention will more fully be apparent from the following detailed description with accompanying drawings.

DETAILED DESCRIPTION OF THE INVENTION

The following describes the present invention on reference to the drawings showing embodiments.

(Embodiment 1)

Figure 1:
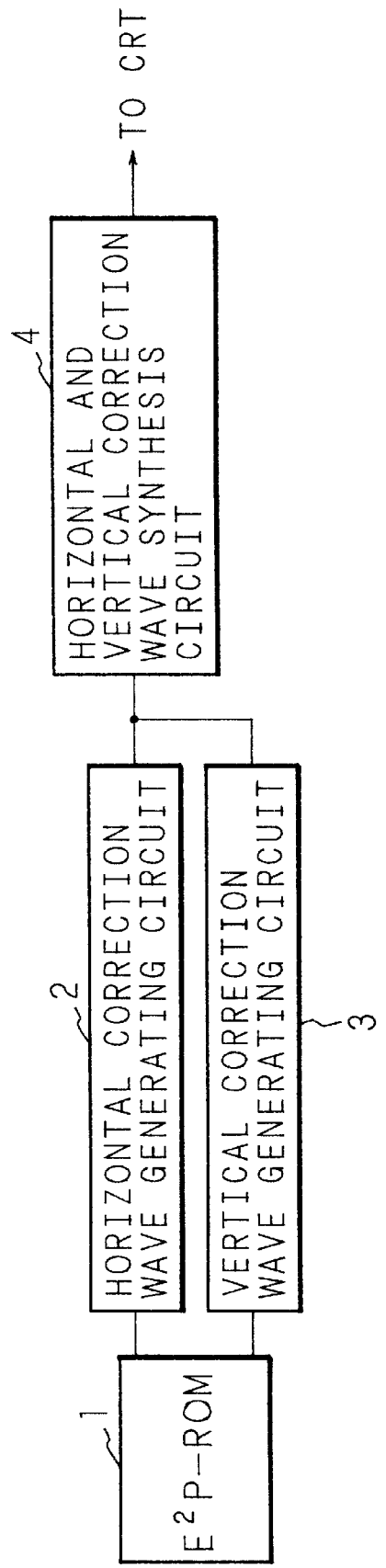
FIG. 1 is a block diagram showing an example of a configuration of a conventional CRT focus correcting circuit.
Figure 2:
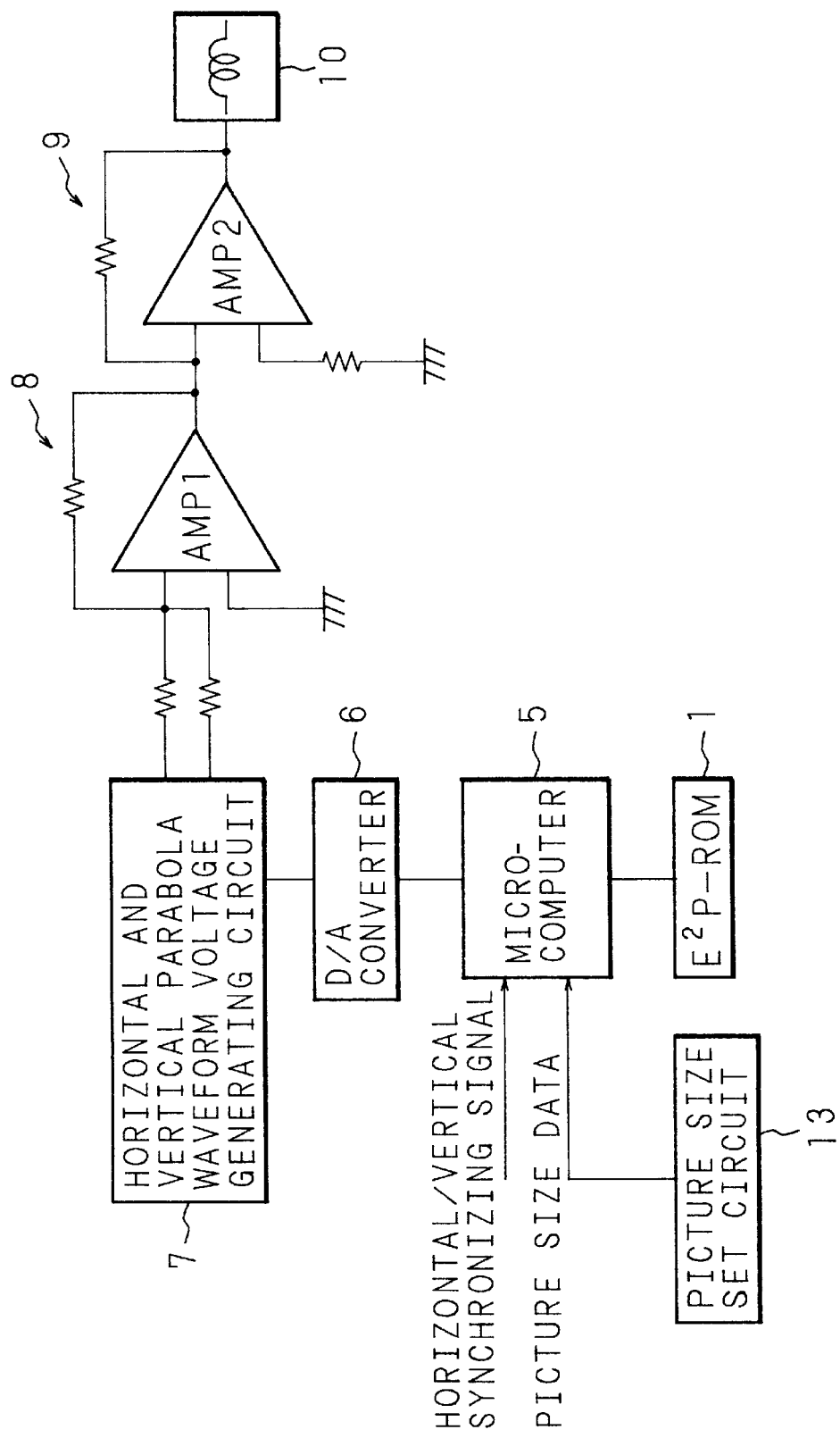
FIG. 2 is a block diagram showing a CRT focus correcting method and a configuration of a CRT focus correcting circuit according to first embodiment of the present invention.

FIG. 2 is a block diagram showing a CRT focus correcting method and a configuration of a CRT focus correcting circuit according to embodiment of the present invention. The CRT focus correcting circuit has a $E^2P$-ROM 1 and a picture size set circuit 13 as the detecting means. The $E^2P$-ROM 1 stores reference correction data which are used for generating a parabola waveform voltage correcting a CRT focus according to a reference picture size (a picture size which is set on shipping of plant) on the CRT screen, i.e., horizontal correction data which are synchronized with a horizontal synchronizing signal, and vertical correction data which are synchronized with a vertical synchronizing signal, and size data of the reference picture size as the first size data. The picture size set circuit 13, which is composed of a variable resistor (not shown) provided on the front surface of a display unit, sets a picture size on the CRT screen and outputs size data of the set picture size as the second size data.

Further, the CRT focus correcting circuit has a microcomputer 5, a D/A converter 6 and a horizontal and vertical parabola waveform voltage generating circuit 7. When the size data outputted by the picture size set circuit 13 are compared with the size data of the reference picture size, and the compared result is such that both the size data do not coincide with each other, the microcomputer 5 calculates horizontal correction data and vertical correction data which are used for correcting a CRT focus according to the picture size set by the picture size set circuit 13 based on the reference correction data according to the reference picture size and both the size data. The D/A converter 6 D/A-converts the calculated result of the microcomputer 5. The horizontal and vertical parabola waveform voltage generating circuit 7 generates and outputs a horizontal parabola waveform voltage, which is synchronized with a horizontal synchronizing signal, and a vertical parabola waveform voltage, which is synchronized with a vertical synchronizing signal, individually based on the calculated result which has been D/A-converted by the D/A converter 6.

In addition, the CRT focus correcting circuit has an adder 8 including an operational amplifier AMP 1, and an inverting amplifier 9 including an operational amplifier AMP 2. The adder 8 adds (synthesizes) the horizontal parabola waveform voltage and vertical parabola waveform voltage outputted individually by the horizontal and vertical parabola waveform voltage generating circuit 7, and inverts and outputs the synthesized parabola waveform voltage. The inverting amplifier 9 inverts, amplifies and outputs the synthesized parabola waveform voltage outputted by the adder 8.

The synthesized parabola waveform voltage outputted by the inverting amplifier 9 is applied to a CRT focus coil 10 or a focus correcting electrode (not shown), and a correcting magnetic field or correcting electric field for correcting a CRT focus is generated.

Figure 3:
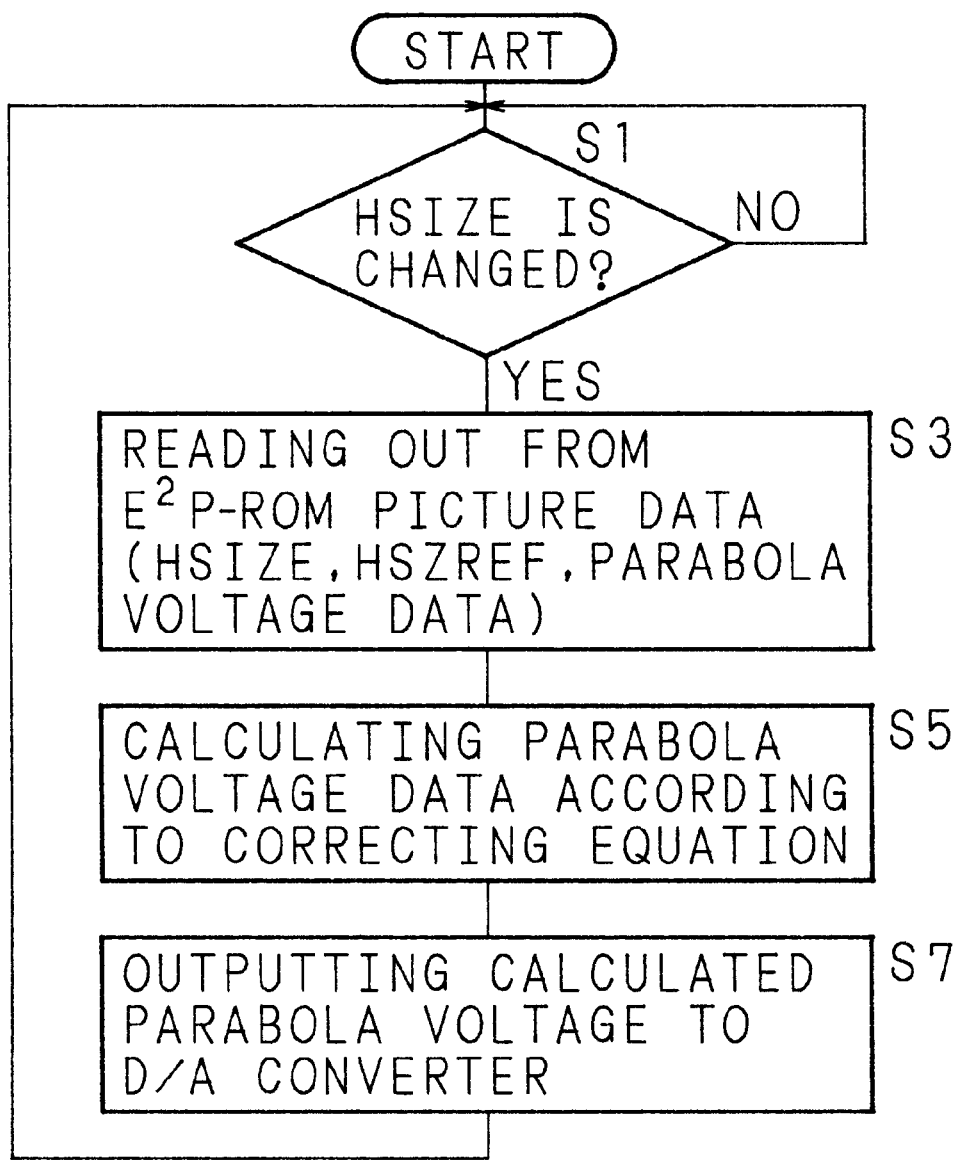
FIG. 3 is a flow chart showing an operation of the CRT focus correcting method and the CRT focus correcting circuit according to the first embodiment of the present invention.

FIG. 3 is a flow chart showing the operation of the CRT focus correcting method and CRT focus correcting circuit of the present invention. The following describes the operation of the CRT focus correcting method and CRT focus correcting circuit on reference to the flow chart.

When information relating to a picture size is inputted from the picture size set circuit 13, the microcomputer 5 compares size data HSIZE of the horizontal picture size with size data HSZREF of a reference picture size (step S1). As a result of the comparison, when the size data HSIZE are changed and thus it does not coincides with the size data HSZREF, the size data HSIZE of the changed horizontal picture size, the size data HSZREF of the reference horizontal picture size and the correction data HDATAREF of a horizontal synchronizing parabola (waveform) voltage in the reference horizontal picture size are read out from the $E^2P$-ROM 1 (step S3).

Thereafter, calculation is made according to a correcting equation (1) by using the read-out data (step S5).

$$HDATA = f_1 \text{ (HDATAREF, HSZREF, HSIZE)} \quad (1)$$

However, HDATA: calculation correction data of the horizontal synchronizing parabola (waveform) voltage after calculation, and $f_1$: arbitrary function of HDATAREF, HSZREF and HSIZE.

For example, $f_1$=HDATAREF−(HSIZE−HSZREF)/3

Thereafter, the calculated calculation correction data HDATA of the horizontal synchronizing parabola voltage are outputted to the D/A converter 6 (step S7).

When at step S1 the result of comparing the size data HSIZE of the horizontal picture size with the size data HSZREF of the reference picture size is such that the size data HSIZE are not changed and coincide with the size data HSZREF, the reference correction data HDATAREF according to the horizontal synchronizing parabola voltage in the reference horizontal picture size are read out from the $E^2P$-ROM 1 with them being synchronized with a horizontal synchronizing signal.

The D/A converter 6 D/A-converts the reference correction data HDATA so as to supply the converted reference correction data HDATA to the horizontal and vertical parabola waveform voltage generating circuit 7. The horizontal and vertical parabola waveform voltage generating circuit 7 generates a horizontal parabola waveform voltage based on the given reference correction data HDATA as an analog signal, and outputs it.

A parabola waveform voltage which is synchronized with a vertical synchronizing signal is corrected in the following manner which is the same as the correction of the parabola waveform voltage which is synchronized with the horizontal signal mentioned above.

Size data VSIZE of a changed vertical picture size, size data VSZREF of a reference vertical picture size and reference correction data VDATAREF according to a vertical synchronizing parabola voltage in the reference vertical picture size are read out from the $E^2P$-ROM 1 with them being synchronized with a vertical synchronizing signal.

Then, calculation is made according to a correcting equation (2) by using the read out data.

$$VDATA = f_2 \text{ (VDATAREF, VSZREF, VSIZE)} \quad (2)$$

However, VDATA: calculation correction data of the vertical synchronizing parabola voltage after calculation, and $f_2$: arbitrary function of VDATAREF, VSZREF and VSIZE.

Thereafter, the calculated calculation correction data VDATA of the vertical synchronizing parabola voltage are outputted to the D/A converter 6.

The size data VSIZE of the vertical picture size are compared with the size data VSZREF of the reference picture size. When the size data VSIZE are not changed and they coincide with the size data VSZREF, the reference correction data VDATAREF corresponding to the vertical synchronizing parabola voltage in the reference vertical picture size are read out from the $E^2$P-ROM 1 with them being synchronized with the vertical synchronizing signal.

The D/A converter 6 D/A-converts the reference correction data VDATA and applies them to the horizontal and vertical parabola waveform voltage generating circuit 7. The horizontal and vertical parabola waveform voltage generating circuit 7 generates a vertical parabola waveform voltage based on the given reference correction data VDATA as the analog signal and outputs it.

The horizontal parabola waveform voltage and vertical parabola waveform voltage, which are outputted individually by the horizontal and vertical parabola waveform voltage generating circuit 7, are added (synthesized), inverted and outputted by the adder 8. The synthesized parabola waveform voltage, which have been inverted and outputted by the adder 8, is inverted and amplified and outputted by the inverting amplifier 9. Thereafter, the synthesized parabola waveform voltage is applied to the CRT focus coil 10 or the focus correcting electrode, and a correcting magnetic field or correcting electric field for correcting a CRT focus is generated.

As mentioned above, even if the horizontal/vertical picture size is changed, the parabola waveform voltage which is used for the most suitable dynamic focus can be obtained. For this reason, the most suitable focus can be obtained, and the focus can continuously follow the change in the picture size.

In addition, since only the reference correction data of the reference picture size are stored, the memory capacity can be reduced greatly.

(Embodiment 2)

Figure 4:
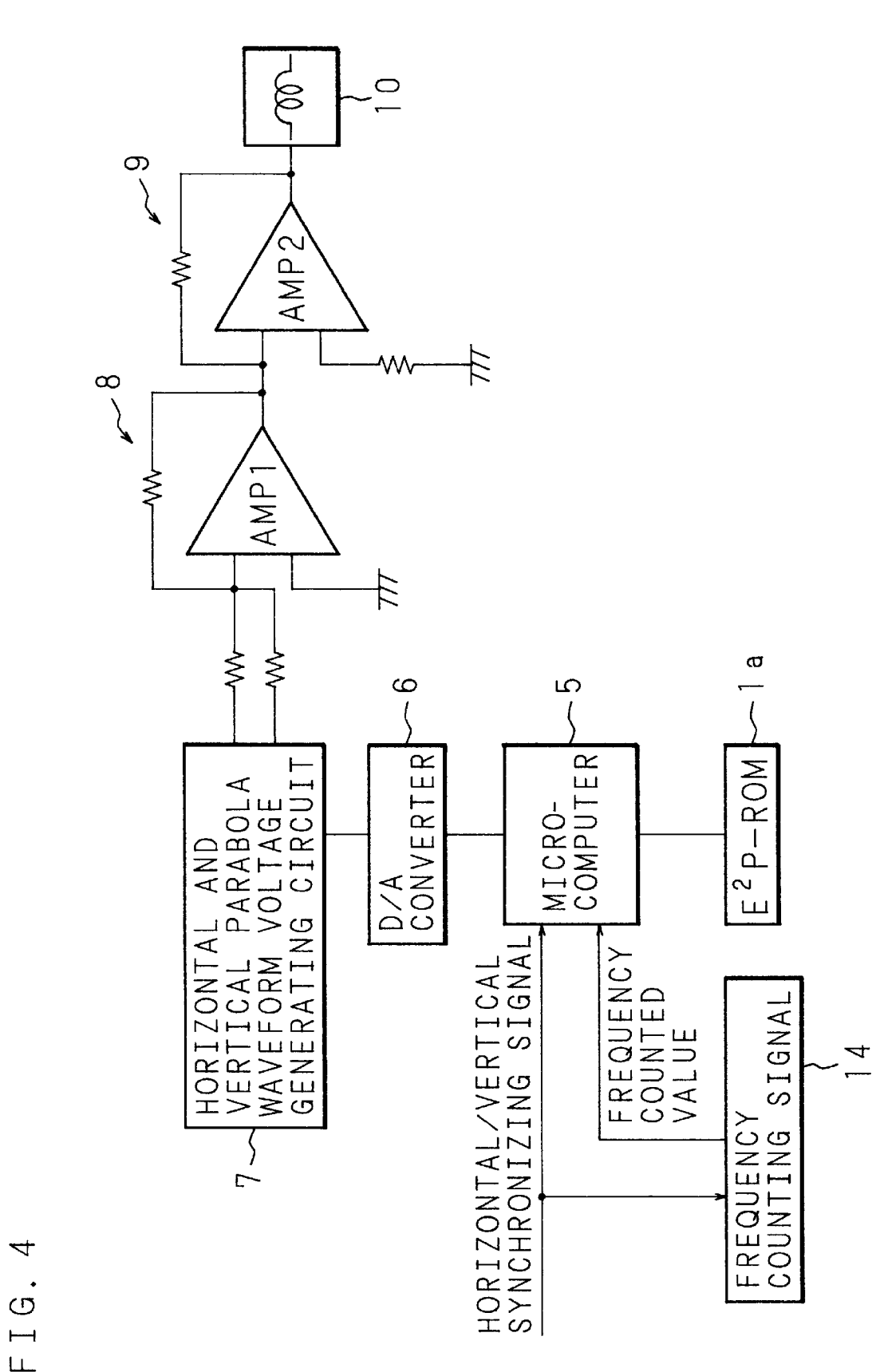
FIG. 4 is a block diagram showing the CRT focus correcting method and a configuration of the CRT focus correcting circuit according to second embodiment of the present invention.

FIG. 4 is a block diagram showing the CRT focus correction method and the configuration of the CRT focus correcting circuit according to the embodiment of the present invention. The CRT focus correcting circuit is provided with a $E^2$P-ROM 1a and a frequency counting circuit 14. The $E^2$P-ROM 1a stores upper and lower limit values of a frequency of a CRT horizontal synchronizing signal, and respective reference correction data for generating the most suitable parabola waveform voltages which correct a CRT focus according to the upper and lower limit values. When a horizontal synchronizing signal and vertical synchronizing signal are given, the frequency counting circuit 14, as the detecting means, counts the frequency of the horizontal synchronizing signal and gives the frequency counted value to the microcomputer 5.

The microcomputer 5 compares a second frequency given this time by the frequency counting circuit 14 with a first frequency given previous time by the frequency counting circuit 14, and when both the frequencies do not coincide with each other, calculation correction data, which are used for correcting a CRT focus according to the frequency given this time, are calculated based on the frequency given this time, its upper and lower limit values and the respective reference correction data. The other configurations are the same as those in the CRT focus correcting circuit according to the aforementioned embodiment 1, so the description thereof is omitted.

Figure 5:
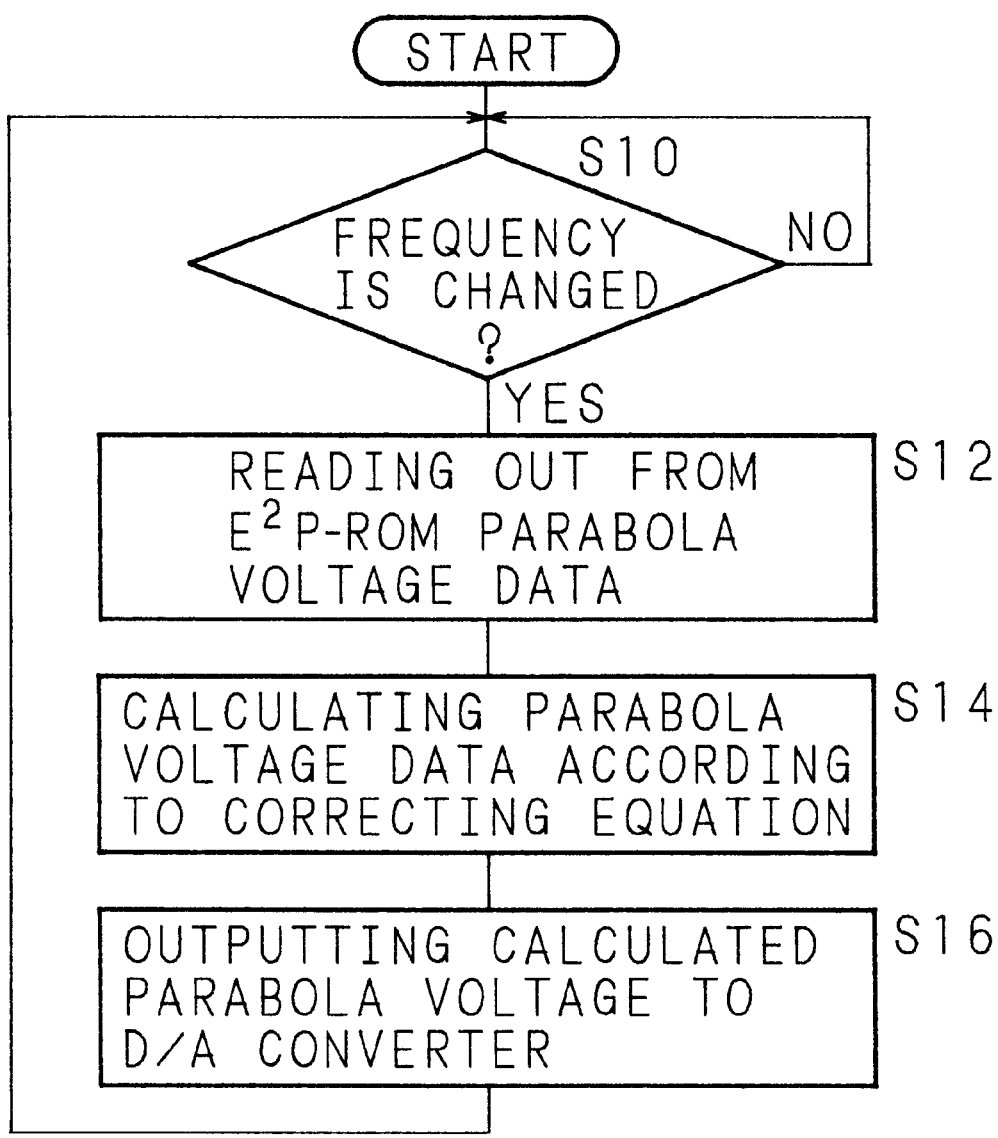
FIG. 5 is a flow chart showing an operation of the CRT focus correcting method and CRT focus correcting circuit according to the second embodiment.

FIG. 5 is a flow chart showing the operation of the CRT focus correcting method and the CRT focus correcting circuit of the present invention. The following describes the CRT focus correcting method and an operation of the CRT focus correcting circuit according to embodiment 2 on reference to the flow chart.

In general, as a frequency of a horizontal synchronizing signal is lower, a ratio of an image display time to a horizontal scanning time is smaller. For this reason, a larger horizontal parabola waveform voltage, which is used for correcting a CRT dynamic focus, is required.

When a frequency HF is inputted from the frequency counting circuit 14, the microcomputer 5 compares the inputted frequency HF with a frequency inputted previous time from the frequency counting circuit 14 (step S10). Then the frequency HF of the horizontal synchronizing signal is changed and thus both the frequencies do not coincides with each other, the changed frequency HF inputted this time, an upper limit value HFREF 1 and lower limit value HFREF 2 of the frequency of the horizontal synchronizing signal, reference correction data HDATAREF 1 corresponding to a horizontal synchronizing parabola (waveform) voltage of the upper limit value, and reference correction data HDATAREF 2 corresponding to a horizontal synchronizing parabola (waveform) voltage of the lower limit are read out from the $E^2$-ROM 1a with them being synchronized with the horizontal synchronizing signal (step S12).

Thereafter, calculation is made according to a correcting equation (3) by using the read-out data (step S14).

$$HDATA = f_3 \ (HF, HFREF1, HFREF2, HDATAREF1, HDATAREF2) \qquad (3)$$

However, HDATA: calculation correction data of the horizontal parabola voltage after calculation, and $f_3$: arbitrary function of HF, HFREF1, HFREF2, HDATAREF1 and HDATAREF2.

Then, the calculated calculation correction data HDATA of the horizontal synchronizing parabola voltage are outputted into the D/A converter 6 (step S16).

The frequency HF inputted this time is compared with the frequency inputted previous time by the frequency counting circuit 14 (step S10), and when both the frequencies coincide with each other, the sequence waits for that a frequency is inputted next time from the frequency counting circuit 14. When the frequency is inputted next time, the inputted frequency is compared with the frequency inputted previous time (step S10).

When both the frequencies coincides with each other (step S10), the calculation is not made according to the correcting equation (3), and the correction data HDATA are not changed.

The parabola waveform voltage which is synchronized with a vertical synchronizing signal is corrected in the same manner as the embodiment 1.

The horizontal and vertical parabola waveform voltages, which are outputted individually from the horizontal and vertical parabola waveform voltage generating circuit 7, are added (synthesized), inverted and outputted by the adder 8. The synthesized parabola waveform voltage, which has been inverted and outputted by the adder 8, is inverted and amplified by the inverting amplifier 9 so as to be outputted, and it is given to the CRT focus coil 10 or the correcting electrode, and a correcting magnetic field or a correcting electric field for correcting a CRT focus is generated.

As mentioned above, since the parabola waveform voltage, which is used for the most suitable dynamic focus even if the frequency of the horizontal synchronizing signal is changed, the most suitable focus can be obtained, and thus the focus can continuously follow the change in the frequency of the horizontal synchronizing signal.

In addition, since the reference correction data of the upper and lower limit values of the frequency of the horizontal synchronizing signal are stored, the memory capacity can be reduced greatly, and a number of adjusting points can be small.

(Embodiment 3)

Figure 6:
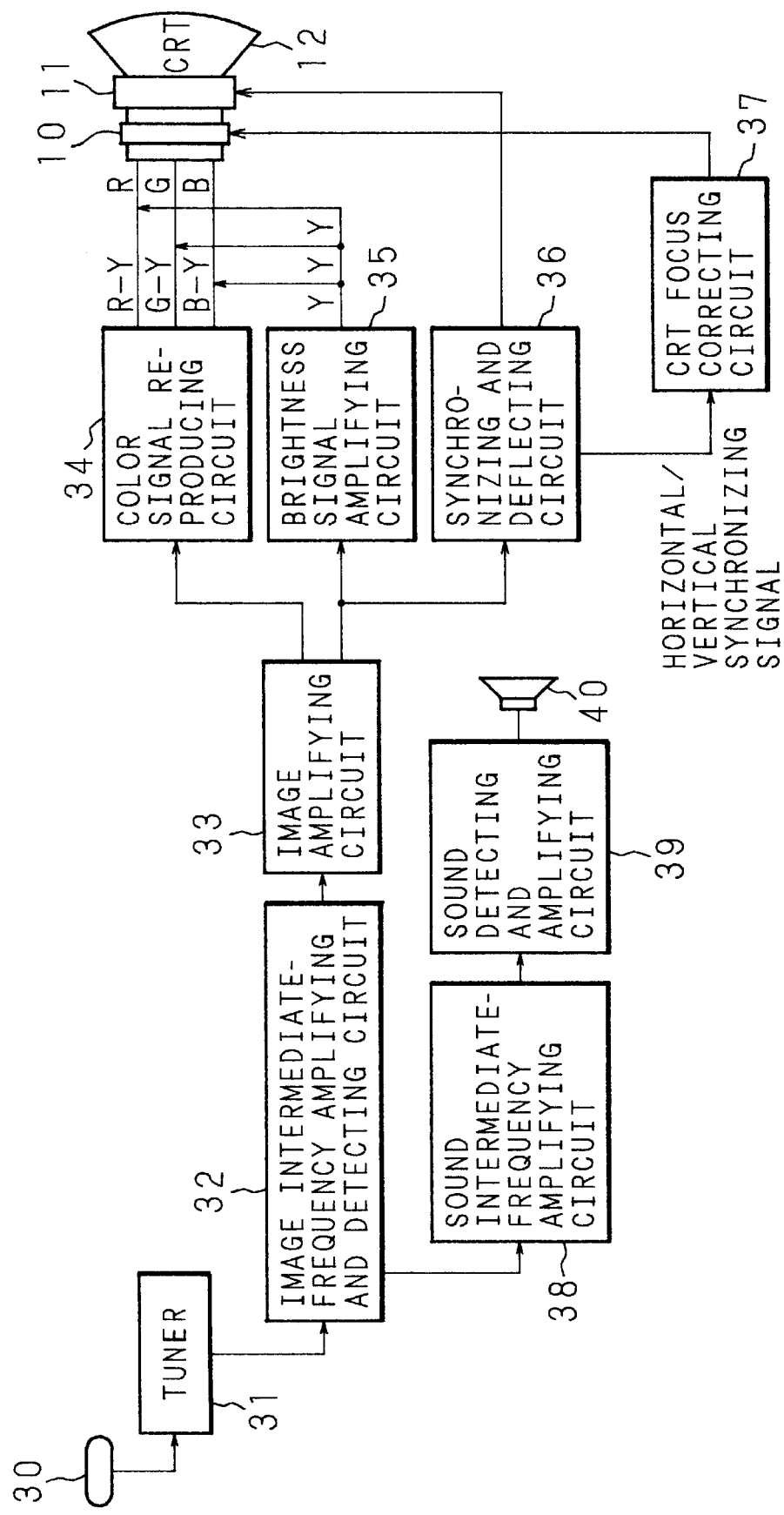
FIG. 6 is a block diagram showing an arrangement of a display unit of the present invention.

FIG. 6 is a block diagram showing an arrangement of the display unit according to embodiment of the present invention. The display unit is a color television image receiver, and a color television radio wave, which has been received by an antenna 30, is selectively amplified by a tuner 31 as well as converted into an intermediate-frequency signal so as to be transmitted to an image intermediate-frequency amplifying and detecting circuit 32. The intermediate-frequency signal is amplified by the image intermediate-frequency amplifying and detecting circuit 32 so as to be separated into a color television signal and a sound intermediate-frequency signal. After the sound intermediate-frequency signal is amplified by a sound intermediate-frequency amplifying circuit 38, the sound signal is detected and amplified by a sound detecting and amplifying circuit 39 so as to be outputted from a speaker 40.

After the color television signal is amplified by the image amplifying circuit 33, it is separated into a carrier chrominance signal C and a brightness signal Y. The carrier chrominance signal C is transmitted to a color signal reproducing circuit 34, and the brightness signal Y is transmitted to a brightness signal amplifying circuit 35 and a synchronizing deflecting circuit 36. The color signal reproducing circuit 34 reproduces color-difference signals R—Y, G—Y, and B—Y from the carrier chrominance signal C and outputs the color-difference signals. The brightness signal Y, which has been amplified by the brightness signal amplifying circuit 35, is added respectively to the color-difference signals R—Y, G—Y and B—Y, and each of them becomes color signals R, G and B so as to be inputted to a CRT 12. In the CRT 12, the color signals R, G and B become electron beams according to the respective strength.

In addition, the synchronizing and deflecting circuit 36 supplies the vertical and horizontal synchronizing signals respectively to a CRT focus correcting circuit 37 and a deflecting coil 11. The other configurations and operations are the same as those of the CRT focus correcting circuit described in the embodiment 1, so the description thereof is omitted.

As mentioned above, since even if the horizontal/vertical picture size is changed, the parabola waveform voltage for the most suitable dynamic focus can be obtained, the most suitable focus can be obtained, and thus the focus can continuously follow the change in the picture size.

In addition, since only the correction data of the reference picture size are stored, the memory capacity can be reduced greatly.

Here, in the case where the configurations and operations of the CRT focus correcting circuit 37 shown in FIG. 6 are the same as those of the CRT focus correcting circuit described in the embodiment 2, even if the frequency of the horizontal synchronizing signal is changed, the parabola waveform voltage for the most suitable dynamic focus can be obtained. For this reason, the most suitable focus can be obtained, and thus the focus can continuously follow the change in the frequency of the horizontal synchronizing signal.

In addition, since only the correction data of the upper and lower limit values of the frequency of the horizontal synchronizing signal are stored, the memory capacity can be reduced greatly, and a number of adjusting points can be small.

Furthermore, in the case where the configurations and operations of the CRT focus correcting circuit 37 shown in FIG. 6 are the same as those of the CRT focus correcting circuits described in the embodiments 1 and 2, even if the horizontal/vertical picture size and the frequency of the horizontal synchronizing signal are changed, the parabola waveform voltage for the suitable dynamic focus can be obtained.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A CRT focus correcting method, comprising the steps of:

judging whether reference data relating to a picture size on a CRT screen have changed or not;

when the reference data have changed, calculating calculation correction data for correcting a CRT focus according to a changed data; and generating parabola waveform voltage based on the calculation correction data.

2. A CRT focus correcting method, comprising the steps of:

judging whether reference data relating to a picture size on a CRT screen or a frequency of a CRT horizontal synchronizing signal have changed or not;

when the reference data have changed, calculating calculation correction data for correcting a CRT focus according to a changed data; and generating parabola waveform voltage based on the calculation correction data, wherein the reference data is a first size data of a reference picture size on the CRT screen, the changed data is a second size data of a picture size set externally, and a reference correction data which are used for generating a parabola waveform voltage correcting a CRT focus according to the reference picture size, and the first size data of the reference picture size are previously stored, in the step of judging, a comparison between the first size data and the second size data is executed, and in the step of calculating the calculation correction data, when the first and the second size data do not coincide with each other, the calculation of the calculation correction data is executed based on the reference correction data and the first and the second size data.

3. A CRT focus correcting method, comprising the steps of:

judging whether reference data relating to a frequency of a CRT horizontal synchronizing signal have changed or not;

when the reference data have changed, calculating calculation correction data for correcting a CRT focus according to a changed data;

generating parabola waveform voltage based on the calculation correction data: and counting a frequency of a CRT horizontal synchronizing signal, wherein the reference data is a first frequency of the CRT horizontal synchronizing signal which has been counted previous time, the changed data is a second frequency which was counted this time, and upper and lower limit values of the frequency of the horizontal synchronizing signal, and respective reference correction data, which are used for generating parabola waveform voltages correcting respectively a CRT focus according to the upper and lower limit values, are previously stored, in the step of judging, a comparison between the first frequency and the second frequency is executed and in the step of calculating the calculation correction data, when the first and second frequencies do not coincide with each other, the calculation of the calculation correction data is executed based on the second frequency counted this time and the upper and lower limit values and the respective reference correction data.

4. A CRT focus correcting circuit, comprising:

detecting means for detecting a changed data of a reference data relating to a picture size on a CRT screen or a frequency of a CRT horizontal synchronizing signal;

comparison means for comparing the reference data with the changed data;

calculating means for when the compared result of the comparison means is such that the both data do not coincide with each other, calculating calculation correction data which are used for a CRT focus according to the changed data; and a parabola waveform voltage generating circuit for generating and outputting parabola waveform voltage based on the calculated result of the calculating means.

5. A CRT focus correcting circuit according to claim 4, further comprising a memory for storing reference correction data, which are used for generating a parabola waveform voltage correcting a CRT focus according to a reference picture size on a CRT screen, and the reference data as a first size data of the reference picture size, wherein the detecting means is a picture size set circuit for setting externally a picture size and outputted a second size data of the set picture size, the second size data the calculating means calculates the calculation correction data based on the first and the second size data and the reference correction data.

6. A CRT focus correcting circuit according to claim 4, further comprising a memory for storing upper and lower limit values of a frequency of a CRT horizontal synchronizing signal and respective reference correction data, which are used for generating a parabola waveform voltage correcting a CRT focus according to the upper and lower limit values respectively;

wherein the detecting means a frequency counting circuit for counting the frequency of the horizontal synchronizing signal, the reference data is a first frequency which has been counted previous time by the frequency counting circuit, the changed data is a second frequency which was counted this time, and the calculating means calculates the calculation correction data based on the second frequency counted this time and the upper and lower limit values and respective reference correction data.

7. A display unit, comprising:

CRT;

a focus coil for correcting a CRT focus; and a CRT focus correcting circuit for applying a parabola waveform voltage to the focus coil, wherein the CRT focus correcting circuit includes:

detecting means for detecting a changed data of a reference data relating to a picture size on a CRT screen or a frequency of a CRT horizontal synchronizing signal;

comparison means for comparing the reference data with the changed data;

calculating means for when the compared result of the comparison means is such that the both data do not coincide with each other, calculating calculation correction data which are used for a CRT focus according to the changed data; and a parabola waveform voltage generating circuit for generating and outputting parabola waveform voltage based on the calculated result of the calculating means.

8. A display unit according to claim 7, wherein the CRT focus correcting circuit further comprising further comprising a memory for storing reference correction data, which are used for generating a parabola waveform voltage correcting a CRT focus according to a reference picture size on a CRT screen, and the reference data as a first size data of the reference picture size, wherein the detecting means is a picture size set circuit for setting externally a picture size and outputted a second size data of the set picture size, the second size data the calculating means calculates the calculation correction data based on the first and the second size data and the reference correction data.

9. A display unit according to claim 7, wherein the CRT focus correcting circuit further comprising further comprising a memory for storing upper and lower limit values of a frequency of a CRT horizontal synchronizing signal and respective reference correction data, which are used for generating a parabola waveform voltage correcting a CRT focus according to the upper and lower limit values respectively;

wherein the detecting means a frequency counting circuit for counting the frequency of the horizontal synchronizing signal, the reference data is a first frequency which has been counted previous time by the frequency counting circuit, the changed data is a second frequency which was counted this time, and the calculating means calculates the calculation correction data based on the second frequency counted this time and the upper and lower limit values and respective reference correction data.

* * * * *